United States Patent

Souma

(10) Patent No.: US 12,032,354 B2
(45) Date of Patent: Jul. 9, 2024

(54) PROGRAM RESTART ASSISTING APPARATUS

(71) Applicant: FANUC CORPORATION, Yamanashi (JP)

(72) Inventor: Daisaku Souma, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 779 days.

(21) Appl. No.: 17/095,753

(22) Filed: Nov. 12, 2020

(65) Prior Publication Data

US 2021/0157298 A1 May 27, 2021

(30) Foreign Application Priority Data

Nov. 25, 2019 (JP) .................. 2019-212367

(51) Int. Cl.
*G05B 19/4067* (2006.01)
*G05B 19/4155* (2006.01)
*G06T 7/00* (2017.01)

(52) U.S. Cl.
CPC ..... *G05B 19/4067* (2013.01); *G05B 19/4155* (2013.01); *G06T 7/0004* (2013.01); *G05B 2219/34365* (2013.01); *G06T 2207/30164* (2013.01)

(58) Field of Classification Search
CPC ............ G05B 19/4155; G05B 19/4067; G05B 2219/34365; G05B 2219/50098; G05B 2219/50103; G06T 7/0004; G06T 2207/30164

USPC ........................................ 318/567
See application file for complete search history.

(56) References Cited

U.S. PATENT DOCUMENTS

| | | | | |
|---|---|---|---|---|
| 5,293,024 | A * | 3/1994 | Sugahara | B23K 26/08 219/121.67 |
| 5,339,815 | A * | 8/1994 | Liu | G06T 7/41 600/443 |
| 2014/0379117 | A1 * | 12/2014 | Nishimura | G05B 19/404 700/173 |
| 2015/0012126 | A1 * | 1/2015 | Sasaki | G05D 23/1917 700/186 |
| 2017/0329305 | A1 * | 11/2017 | Shindou | G05B 19/4155 |
| 2019/0227528 | A1 * | 7/2019 | Abbott | G06N 20/00 |
| 2020/0311617 | A1 * | 10/2020 | Swan | G06F 9/45558 |

FOREIGN PATENT DOCUMENTS

JP     H7152416 A     6/1995

* cited by examiner

*Primary Examiner* — Gabriel Agared
(74) *Attorney, Agent, or Firm* — HAUPTMAN HAM, LLP

(57) ABSTRACT

A program restart assisting apparatus acquires time series data of a physical amount detected in machining, detects a change point on which a machining state of the machining is changed based on the acquired data, and records the change point of the machining state as a restartable point. Then, the program restart assisting apparatus selects a restart execution point from among the recorded restartable points, with the result that an appropriate restartable point can be easily selected.

12 Claims, 5 Drawing Sheets

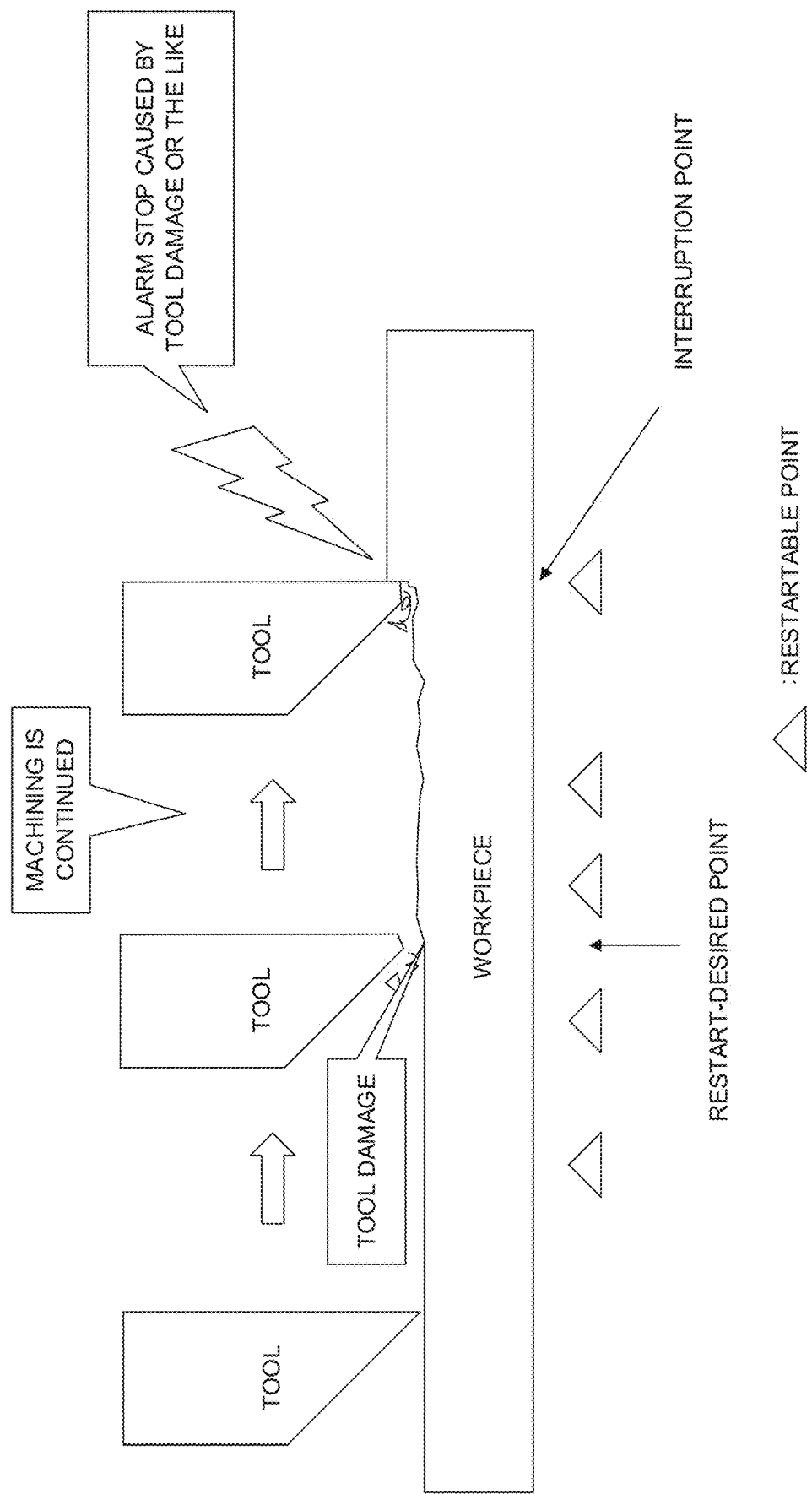

PROGRAM RESTART ASSISTING APPARATUS

RELATED APPLICATIONS

The present application claims priority to Japanese Patent Application Number 2019-212367 filed Nov. 25, 2019, the disclosure of which is hereby incorporated by reference herein in its entirety.

BACKGROUND OF THE INVENTION

1. Field of the Invention

The present invention relates to a program restart assisting apparatus and especially relates to a program restart assisting apparatus that stores a change point of a machining state as a restartable point.

2. Description of the Related Art

A numerical controller for controlling a machine tool performs numerical control processing based on a machining program and controls the machine tool based on the processing result to machine a workpiece as commanded.

In machining a workpiece by using a numerical controller, the machining is sometimes interrupted due to abnormality such as a damage of a tool. In such a case, an operator exchanges the damaged tool and executes a machining program from a block including the machining interruption point (a block in which machining is interrupted or an abnormal point on which the abnormality is detected, such as an alarm generation position) or a block in which machining can be restarted and which is a preceding block of the block including the machining interruption point (an immediately preceding block for a G0 command, an auxiliary function, a call, or the like) so as to restart the machining, as illustrated in FIG. 4. Conventionally, a numerical controller stores interruption points and blocks in which machining can be restarted as restartable points and an operator selects an appropriate restartable point as a restart execution point among the stored restartable points so as to perform program restart. Use of this technique can prevent generation of a critical problem because machining is stopped immediately on detecting an abnormal point (preventive maintenance). On the other hand, false detection of an abnormal point generates useless stop, thereby extending cycle time. For example, it is assumed that an abnormal point is detected during rough machining and the machining is stopped. However, even when some machining errors are generated due to vibration or the like in rough machining, for example, any problem sometimes does not occur. Therefore, checking objects (temperature and vibration, for example) are often carefully selected without strictly detecting abnormality beyond necessity so as to make lax determination of a threshold value for abnormality detection. Here, see Japanese Patent Application Laid-Open No. 07-152416, for example, for a prior art technique for restarting machining.

In some cases of an occurrence of alarm stop caused by a damage of a tool or the like, machining defect is found on a further preceding stage. For example, as illustrated in FIG. 5, there is a case that when a damage of a tool is not so serious and machining can be continued for a while, the damage of the tool is not detected as abnormality at the time of the occurrence of the damage, and when the state of the damage becomes more serious after performing the machining for some time, the damage of the tool is detected and alarm stop occurs. In such a case, a point on which machining is desired to be restarted is not the interruption point but a predetermined position on which a machining defect starts. That is, operators desire to set a point on which change of a machining state appears as a point on which machining is restarted. However, in use of a general machining restart function, a specific start point such as an interruption point (abnormal point) and a block for G0, an auxiliary function, and a call is stored as a restartable point. There is accordingly a problem in that a restartable point does not always match a point on which restart is desired to be performed, in the present state. There may be an idea for detecting a point on which change of a machining state appears by strictly setting abnormal point detecting conditions, but in this case, machining might be interrupted even for appearance of change which does not originally require machining stop, accordingly generating an unfavorable result in a phase of cycle time.

In order to restart machining from a point other than a machining interruption point, it is required to store, on a memory a block in which machining can be restarted and which is a preceding point of the interruption point as a restartable point, as described above. This method, however, does not determine a more appropriate machining restart point, so that a large number of restartable points are stored to be able to store points close to a point desired to be restarted. This causes a problem in that storage capacity as software is increased.

When restart from a point close to a point desired to be restarted is realized by storing a large number of restartable points, an operator needs to determine a restartable point close to the point desired to be restarted among the large number of restartable points. A skilled operator can easily perform such determination. It, however, takes time for an unskilled operator to determine an appropriate restartable point on which machining is to be restarted, and accordingly operating time varies depending on an operator.

SUMMARY OF THE INVENTION

Thus, the technique for facilitating selection of an appropriate restartable point has been desired.

The present invention is provided with a function for detecting change in a machining state and presenting the state change point as a restartable point, thus solving the above-mentioned problems.

A program restart; assisting apparatus according to the present invention assists selection of a restart execution point indicating a position, on which machining is restarted after interruption of the machining, in a machining program, in a controller that controls an industrial machine which machines a workpiece, based on the machining program. The program restart assisting apparatus includes: a data acquisition unit that acquires time series data of a physical amount detected during continuing the machining; a machining state change point detection unit that detects a change point on which a machining state of the machining is changed, based on data acquired by the data acquisition unit; a restartable point recording unit that; records the change point; of the machining state, the change point being detected by the machining state change point detection unit, as a restartable point; and a restart execution point selection unit that selects a restart execution point from among restartable points recorded by the restartable point recording unit.

The change point of the machining state may be a change point in frequency distribution of torque data, vibration data, and sound data, which are detected from the industrial machine, of a motor.

The change point of the machining state may be a change point in a change rate of temperature data, which is detected from the industrial machine, of the motor.

The change point of the machining state may be a change point in torque data, which is detected from the industrial machine, of the motor.

The change point of the machining state may be detected from a chip amount or an image of and a chip shape in machining.

The change point of the machining state may be a change point in laser output in laser machining.

The program restart assisting apparatus may further include a restart execution point analysis unit that calculates an evaluation value which is used for detecting the change point by the machining state change point detection unit, based on time series data which is acquired when machining is once interrupted and then restarted.

The program restart assisting apparatus according to the present invention is provided with the above-described configuration, being capable of presenting only more appropriate restartable points based on machining state change to an operator. Further, the program restart assisting apparatus stores only restartable points which are more likely to be designated as restarting positions, being able to reduce storage capacity as software. Furthermore, in a case of stop based on an alarm or the like, only points which are more likely to be related to the cause of the stop are presented as restartable points, so that an operator can easily select an appropriate restart execution point without depending on his/her rules of thumb.

BRIEF DESCRIPTION OF THE DRAWINGS

FIG. 5 illustrates a problem of a machining restartable point according to a prior art technique.

DETAILED DESCRIPTION OF THE PREFERRED EMBODIMENTS

Figure 1:
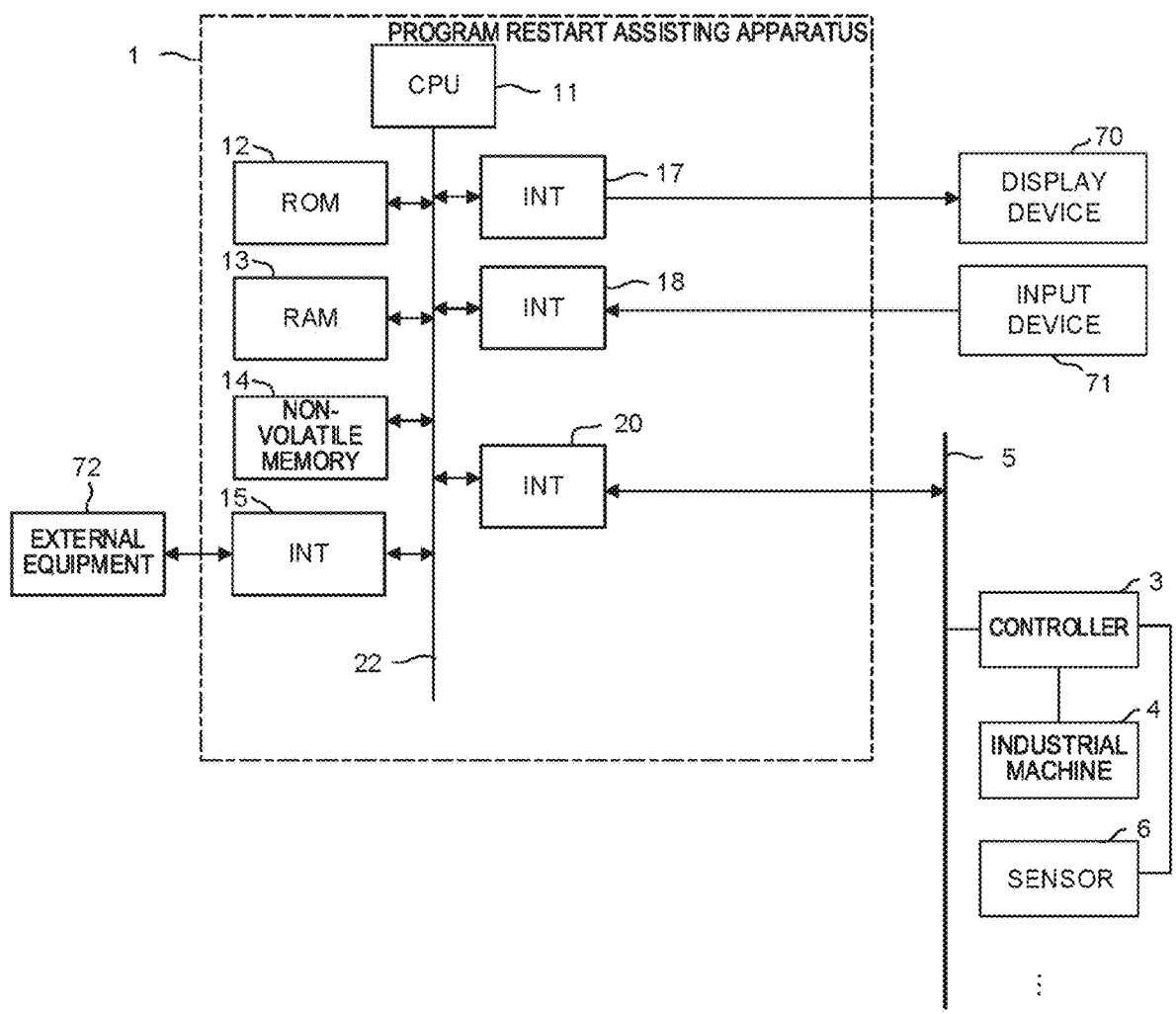
FIG. 1 is a hardware configuration diagram schematically illustrating a program restart assisting apparatus according to an embodiment.

FIG. 1 is a hardware configuration diagram schematically illustrating chief parts of a program restart assisting apparatus according to an embodiment of the present invention.

A program restart assisting apparatus 1 according to the present invention can be mounted as a controller for controlling an industrial machine, for example. Further, the program restart assisting apparatus 1 according to the present invention can be mounted on a personal computer juxtaposed to a controller for controlling an industrial machine, a personal computer connected to a controller via a wired/wireless network, a cell computer, a fog computer, and a cloud server. The present embodiment describes an example in which the program restart assisting apparatus 1 is mounted on a personal computer connected to a controller for controlling an industrial machine via a network.

A CPU 11 included in the program restart assisting apparatus 1 according to the present embodiment is a processor entirely controlling the program restart assisting apparatus 1. The CPU 11 reads a system program stored in a RUM 12 via a bus 22 and controls the whole of the program restart assisting apparatus 1 in accordance with the system program. A RAM 13 temporarily stores temporary calculation data and display data and various kinds of data which are inputted from outside, for example.

A non-volatile memory 14 is composed of, for example, a memory or a solid state drive (SSD) which is backed up by a battery, which is not shown, and a storage state of the non-volatile memory 14 is accordingly maintained even if the program restart assisting apparatus 1 is turned off. The non-volatile memory 14 stores, for example, data read from external equipment 72 via an interface 15, data inputted via an input device 71, and data acquired from a controller 3 via an interface 20. The data stored in the non-volatile memory 14 may be developed on the RAM 13 when the data are executed or used. Further, various kinds of system programs such as a known analysis program are preliminarily written in the ROM 12.

The interface 15 is an interface for connecting the CPU 11 of the program restart assisting apparatus 1 with the external equipment 72 such as a USB device. Data acquired by another industrial machine or the like, for example, can be read from the external equipment 72 side. Data and the like processed in the program restart assisting apparatus 1 can be stored in an external storage means via the external equipment 72.

The interface 20 is an interface for connecting the CPU 11 of the program restart assisting apparatus 1 with a wired/wireless network 5. The controller 3, a fog computer, a cloud server, and the like are connected to the network 5 and receive/transmit data from/to the program restart assisting apparatus 1.

Each piece of data read on a memory and data obtained as a result of execution of a program or the like, for example, are outputted via an interface 17 to be displayed on a display device 70. The input device 71 composed of a keyboard, a pointing device, or the like transmits a command, data, and the like based on an operation by an operator via an interface 18 to the CPU 11.

Figure 2:
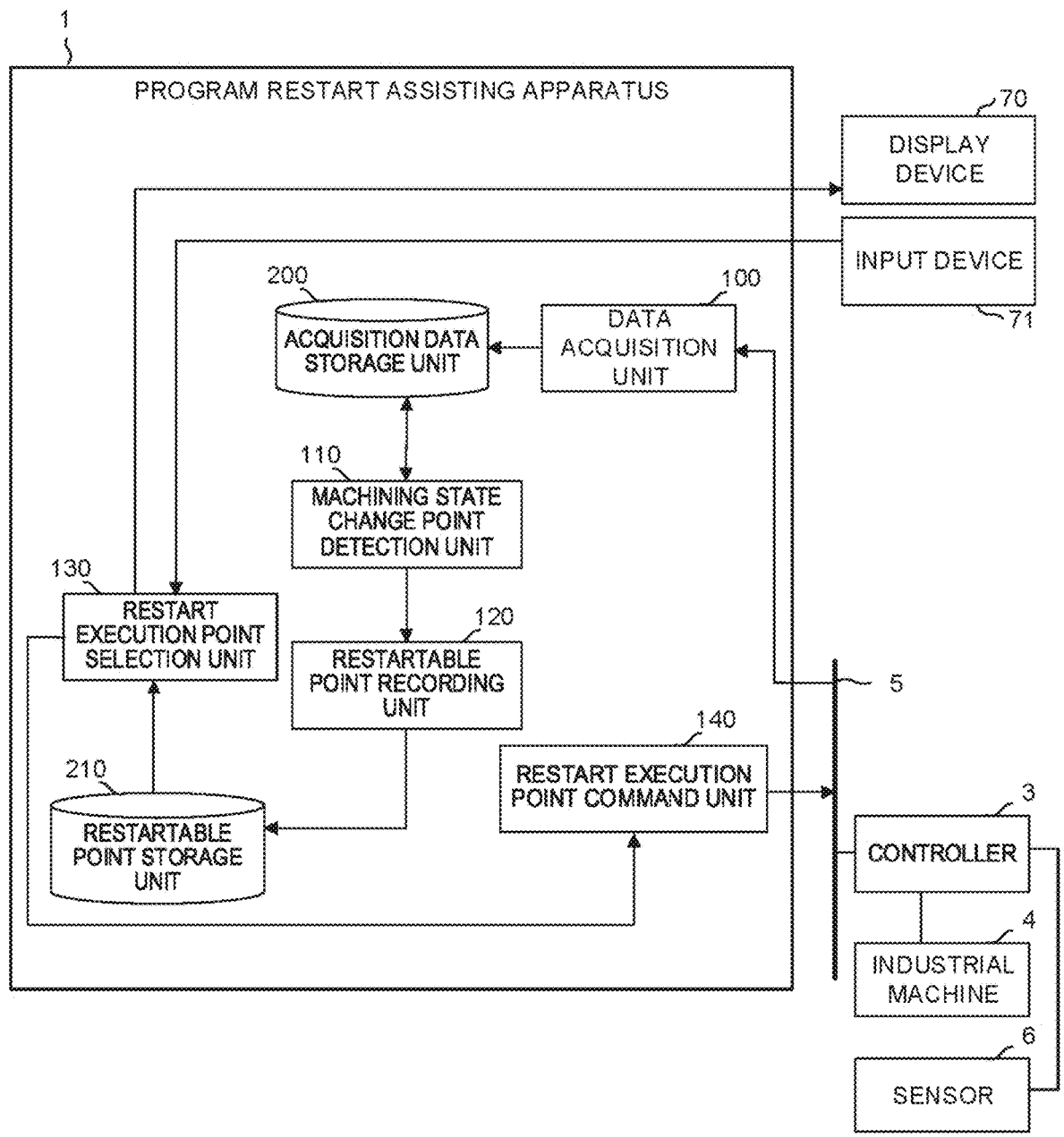
FIG. 2 is a functional block diagram schematically illustrating a program restart assisting apparatus according to a first embodiment.

FIG. 2 is a block diagram schematically illustrating functions provided to the program restart assisting apparatus 1 according to a first embodiment of the present invention.

Each function provided to the program restart assisting apparatus 1 according to the present embodiment is realized when the CPU 11 included in the program restart assisting apparatus 1 illustrated in FIG. 1 executes a system program and controls an operation of each unit of the program restart assisting apparatus 1.

The program restart assisting apparatus 1 according to the present embodiment includes a data acquisition unit 100, a machining state change point detection unit 110, a restartable point recording unit 120, a restart execution point selection unit 130, and a restart execution point command unit 140. Further, in the RAM 13 and the non-volatile memory 14 of the program restart assisting apparatus 1, an acquisition data storage unit 200 which is a region for storing data acquired from the controller 3 or the like and a restartable point storage unit 210 which is a region for storing restartable points are prepared in advance.

The data acquisition unit 100 is realized by executing a system program, which is read from the ROM 12, by the CPU 11 included in the program restart assisting apparatus 1 illustrated in FIG. 1 and mainly by performing arithmetic processing using the RAM 13 and the non-volatile memory 14 by the CPU 11 and input control processing by the interface 20. The data acquisition unit 100 acquires, for example, time series data detected in an operation of an industrial machine 4 and data indicating change of a signal at predetermined time. The data indicating change of a signal at predetermined time can be handled as time series data by expressing change of a signal on a time axis. The data acquisition unit 100 acquires positional data, speed data, acceleration data, torque data, and temperature data of a motor of the industrial machine 4, information related to execution of each block of a machining program in the industrial machine 4 (a kind of a block and a start point and an end point of a block, for example), vibration data, sound data, and image data which are detected by a sensor 6 attached to the industrial machine 4, various kinds of data stored in the controller 3 which controls the industrial machine 4, and so on.

A sensor attached to an element other than the industrial machine 4 may be used as the sensor 6. Examples of a sensor which may be used as the sensor 6 include a phonocardiograph, a sphygmomanometer, a thermometer, or the like attached to an operator performing machining with the industrial machine 4 and a vibration sensor, an optical sensor, an imaging sensor, and the like which are installed in the vicinity of a position on which the industrial machine 4 is installed. Any sensor may be used as the sensor 6 as long as the sensor is capable of directly or indirectly detecting change in machining. The data acquisition unit 100 may directly acquire data related to the industrial machine 4 from the controller 3 via the network 5. The data acquired by the data acquisition unit 100 is stored in the acquisition data storage unit 200.

The machining state change point detection unit 110 is realized by executing the system program, which is read from the ROM 12, by the CPU 11 included in the program restart assisting apparatus 1 illustrated in FIG. 1 and mainly by performing arithmetic processing using the RAM 13 and the non-volatile memory 14 by the CPU 11. The machining state change point detection unit 110 analyzes time series data, which is related to a machining state of the industrial machine 4 and is acquired by the data acquisition unit 100, so as to detect a point on which the machining state is changed during machining of a workpiece. The machining state change point detection unit 110 recognizes a period, in which a kind of a block is a cutting feed command and a motor torque of the industrial machine 4 is kept to be a predetermined threshold value or greater, for example, as a period during continuing machining of a workpiece. The machining state change point detection unit 110 may perform frequency analysis of torque data, vibration data, and sound data which are detected in a predetermined machining period in machining of a workpiece and detect time at which predetermined difference (a square sum of amplitude difference in frequency components is equal to or greater than a predetermined threshold value, for example) appears in frequency components, for example, as a point on which a machining state is changed.

The machining state change point detection unit 110 may detect time at which a change rate of a motor temperature detected in a predetermined machining period in machining of a workpiece is changed by a predetermined threshold value or greater, for example, as a point on which a machining state is changed. The machining state change point detection unit 110 may detect time at which an amount, a shape, and a color of chips are changed by a predetermined threshold value or greater based on image data which is detected in a predetermined machining period in machining of a workpiece, for example, as a point on which a machining state is changed. The machining state change point detection unit 110 may detect time at which laser output detected in a predetermined machining period in laser machining of a workpiece is changed by a predetermined threshold value or greater, for example, as a point on which a machining state is changed. For the simpler configuration, a threshold value which is sufficiently smaller than a threshold value of an impact value (torque change value) used when the industrial machine 4 issues an alert (for example, a threshold value which is a half of a threshold value used when the industrial machine 4 issues an alert) may be preliminarily set and the machining state change point detection unit 110 may detect time, at which an impact value being larger than the small threshold value is detected in machining of a workpiece, as a point on which a machining state is changed.

Further, the machining state change point detection unit 110 may detect change in biological information of an operator performing machining with the industrial machine 4, for example, so as to indirectly detect a point on which a machining state is changed. When an operator finds change in a machining state, his/her cardiac sounds, blood pressure, body temperature, perspiration condition, and the like are sometimes change in a subtle way. The machining state change point detection unit 110 may determine a point on which a past state is changed, based on such change in operator's biological information.

Furthermore, the machining state change point detection unit 110 may combine the above-described methods to detect a point on which a machining state is changed. When significant differences are found in frequency-components of torque data, vibration data, and sound data before and after time at which an impact value being larger than the above-mentioned small threshold value is detected in machining of a workpiece, the machining state change point detection unit 110 may detect, the time as a point on which a machining state is changed, for example. Thus, the machining state change point detection unit 110 extracts not only a machining interruption point but also a point on which a machining state is changed before the interruption point. Change points of a machining state detected by the machining state change point detection unit 110 include a point before and after which a significant difference is recognized in the machining state though the significant difference is not at a level as high as a level at which the industrial machine 4 issues an alert. Note that acquisition data stored in the acquisition data storage unit 200 may be deleted by the machining state change point detection unit 110 while leaving only acquisition data for a time width required for analyzing a change point of a machining state. This prevents the acquisition data storage unit 200 from occupying a large memory region.

The restartable point recording unit 120 is realized by executing the system program, which is read from the ROM 12, by the CPU 11 included in the program restart assisting apparatus 1 illustrated in FIG. 1 and mainly by performing arithmetic processing using the RAM 13 and the non-volatile memory 14 by the CPU 11. The restartable point recording unit 120 additionally records a point, on which a machining state is changed and which is detected by the machining state change point detection unit 110, in the restartable point storage unit 210 as a restartable point. The restartable point recording unit 120 may record a set of a block of a machining program including a point at which a machining state is changed and time from the start of the block to the point at which the machining state is changed, in the restartable point storage unit 210 as a restartable point. The restartable point storage unit 210 is capable of storing a plurality of restartable points.

The restart execution point selection unit 130 is realized by executing the system program, which is read from the ROM 12, by the CPU 11 included in the program restart assisting apparatus 1 illustrated in FIG. 1 and mainly by performing arithmetic processing using the RAM 13 and the non-volatile memory 14 by the CPU 11 and input and output processing using the interfaces 17 and 18. The restart execution point selection unit 130 displays restartable points, which are stored in the restartable point storage unit 210, on the display device 70. Then, the restart execution point selection unit 130 permits selection of a restart execution point which is a point on which machining is restarted among the displayed restartable points through an operation of the input device 71. The selected restart execution point is outputted to the restart execution point command unit 140.

For displaying a machining program on the display device 70, the restart execution point selection unit 130 may allow the display device 70 to display a restartable point in a manner that the restartable point is associated with a block of the machining program. Further the restart execution point selection unit 130 may perform machining simulation based on a machining program and display a machining route and a workpiece shape which are the results of the simulation so as to display a restartable point in a manner that the restartable point is associated with the machining route and the workpiece shape. The restart execution point selection unit 130 may allow an operator to select a restart execution point among restartable points displayed on the display device 70 through operation with a keyboard or a pointing device.

The restart execution point command unit 140 is realized by executing the system program, which is read from the ROM 12, by the CPU 11 included in the program restart assisting apparatus 1 illustrated in FIG. 1 and mainly by performing arithmetic processing using the RAM 13 and the non-volatile memory 14 by the CPU 11 and input control processing by the interface 20. The restart execution point command unit 140 outputs a command to the controller 3 controlling the industrial machine 4 so that machining is restarted from a restart execution point selected by the restart execution point selection unit 130.

The program restart assisting apparatus 1 having the above-described configuration according to the present embodiment does not store conventional restartable points such as a machining interruption point and a block for G0, an auxiliary function, and a call, but stores a time before or after the conventional restartable point at which a machining state is changed in machining of a workpiece, as a restartable point. Accordingly, only a more appropriate restartable point based on change of a machining state can be presented to an operator. Further, only a restartable point which is more likely to be designated as a position on which machining is restarted is stored, enabling to reduce storage capacity as software. Furthermore, in a case of stop based on an alarm or the like, only a point which is more likely to be related to the cause of the stop is stored as a restartable point, enabling an operator to easily select an appropriate restart execution point without depending on his/her rules of thumb.

Figure 3:
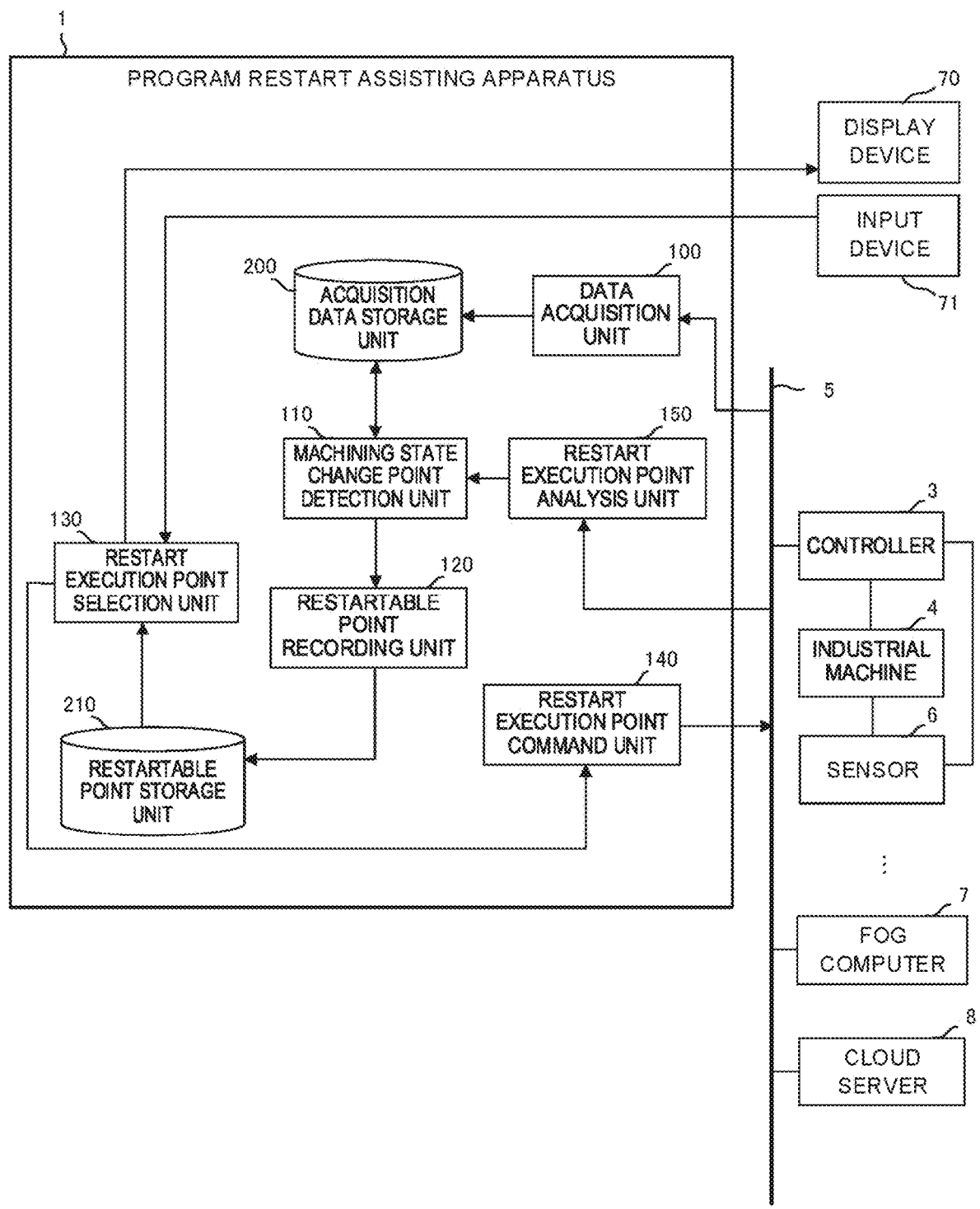
FIG. 3 is a functional block diagram schematically illustrating a program restart assisting apparatus according to a second embodiment.
Figure 4:
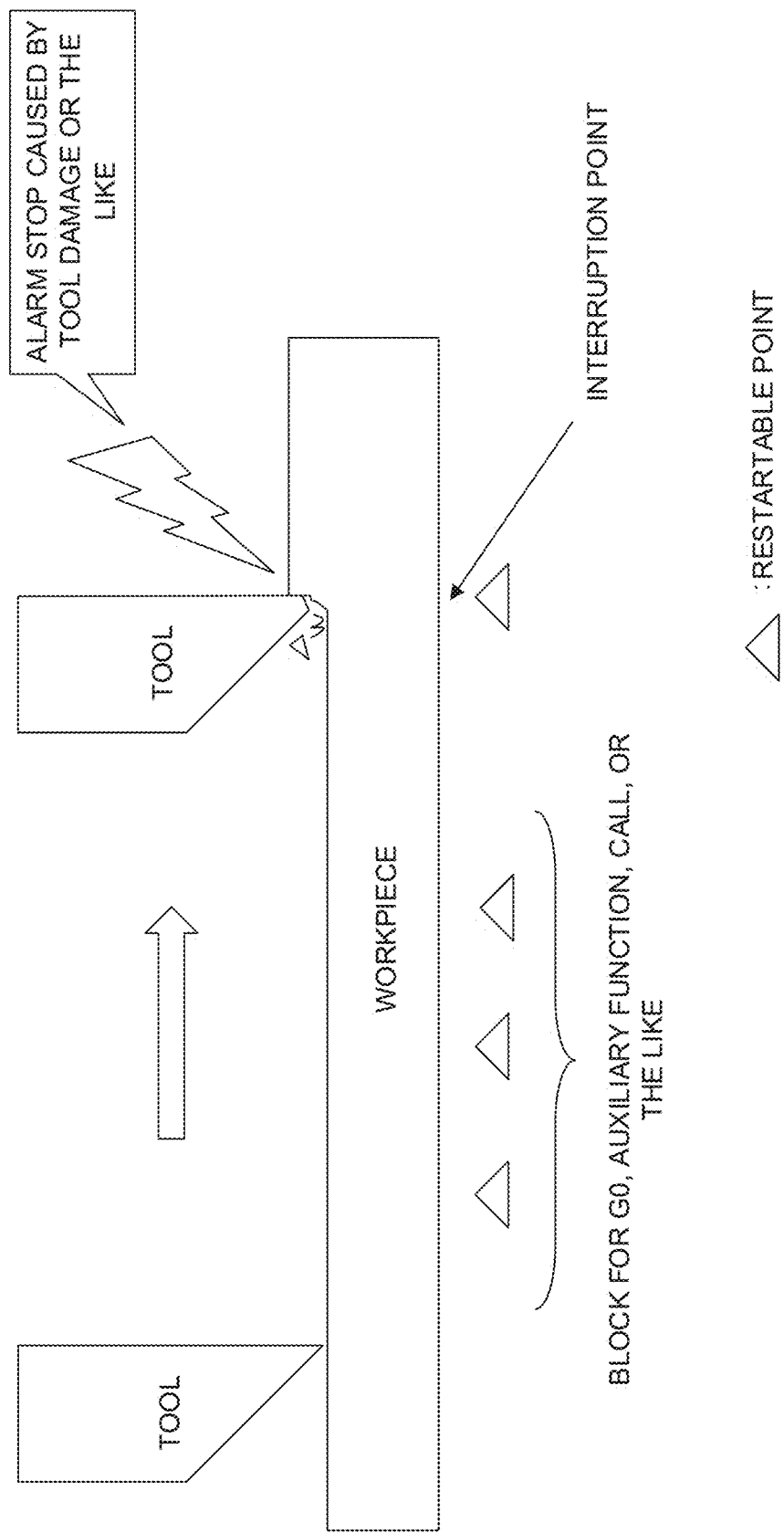
FIG. 4 illustrates a machining restartable point according to a prior art technique.

FIG. 3 is a block diagram schematically illustrating functions provided to the program restart assisting apparatus 1 according to a second embodiment of the present invention.

Each function provided to the program restart assisting apparatus 1 according to the present embodiment is realized when the CPU 11 included in the program restart assisting apparatus 1 illustrated in FIG. 1 executes a system program and controls an operation of each unit of the program restart assisting apparatus 1.

The program restart assisting apparatus 1 according to the present embodiment detects a change point of a machining state by using time series data that is detected before and after a point on which machining is restarted by a skilled operator after interruption of the machining in past driving of an industrial machine and that is detected in an operation of the industrial machine and also using data indicating change of a signal at predetermined time, for example. In the present embodiment, the program restart assisting apparatus 1 is connected to a fog computer 7 or a cloud server 8 via the network 5. The fog computer 7 or the cloud server 8 stores a plurality of sets of time series data that are detected before and after a point on which machining is restarted by a skilled operator after interruption of the machining in past driving of an industrial machine and that are detected in an operation of the industrial machine, and data indicating change of a signal at predetermined time, for example.

The program restart assisting apparatus 1 according to the present embodiment further includes a restart execution point analysis unit 150 in addition to the functions provided to the program restart assisting apparatus 1 according to the first embodiment.

The restart execution point analysis unit 150 is realized by executing the system program, which is read from the ROM 12, by the CPU 11 included in the program restart assisting apparatus 1 illustrated in FIG. 1 and mainly by performing arithmetic processing using the RAM 13 and the non-volatile memory 14 by the CPU 11 and input control processing by the interface 20. The restart execution point analysis unit 150 analyzes time series data that is detected before and after a point on which machining is restarted after interruption thereof in the past machining and that is detected in an operation of an industrial machine, and data indicating change of a signal at predetermined time, for example, so as to calculate an evaluation value indicating a changing trend before and after a point which is selected as a restart execution point. The time series data and the data indicating the change of a signal are stored in the fog computer 7 or the cloud server 8.

The restart execution point analysis unit 150 performs, for each of a plurality of data sets stored in the fog computer 7 or the cloud server 8, frequency analysis of torque data, vibration data, and sound data, which are detected before and after a point selected as a restart execution point, for example, before and after the point respectively so as to calculate square gums of amplitude difference of respective frequency components. Then, a value may be calculated as an evaluation value by multiplying an average value of the square sums by a predetermined constant (for example, 0.8 to 0.9). The restart execution point analysis unit 150 calculates, for each of a plurality of data sets stored in the fog computer 7 or the cloud server 8, a change rate between motor temperatures detected before and after a point selected as a restart execution point, for example. Then, a value may be calculated as an evaluation value by multiplying an average value of the change rates by a predetermined constant (for example, 0.8 to 0.9).

Then, the machining state change point detection unit 110 according to the present embodiment detects a change point of a machining state based on the evaluation value analyzed by the restart execution point analysis unit 150. More specifically, the machining state change point detection unit 110 uses the evaluation value calculated by the restart execution point analysis unit 150 as a threshold value for detecting a change point of a machining state.

The program restart assisting apparatus 1 having the above-described configuration according to the present embodiment is capable of analyzing change in a machining state before and after a point selected as a machining restart position by a skilled person in the past, and newly using the analysis result in detecting a change point of a machining state.

As one modification of the program restart assisting apparatus 1 according to the present embodiment, the program restart assisting apparatus 1 may be configured to employ a machine learning apparatus as the restart execution point analysis unit 150. In this case, for example, the program restart assisting apparatus 1 may be configured so that in a training period of the machine learning apparatus, a machining state (a motor load, a motor temperature, an amount and a shape of chips, impact, laser output, and the like), a running block, and distribution of machining elapsed time are sampled and unsupervised learning using the sampling data is performed, while in an operation period, it is determined that a machining state is changed if there is no data of the training period in the prescribed vicinity at the time of machining. In the use of a machine learning apparatus, the restart execution point analysis unit 150 creates a data set separated before and after a restart, execution point for data which is stored in the fog computer 7 or the cloud server 8 and detected before and after a point on which machining has been restarted after interruption thereof in the past machining. Subsequently a label indicating correct data is imparted to the data set and machine learning using the data set as teacher data is performed to generate a learning model. Then, the machining state change point detection unit 110 executes processing for detecting a change point with data acquired by the data acquisition unit 100 as an input based on the generated learning model. For example, a neural network, a SVM, and the like may be employed as the machine learning apparatus.

The embodiments according to the present invention have been described above. However, the present invention is not limited to the examples of the above-described embodiments but may be embodied in various aspects by adding appropriate alterations.

The invention claimed is:

1. A program restart assisting apparatus for assisting selection of a restart execution point indicating a position, on which machining is restarted after interruption of the machining, in a machining program, in a controller for controlling an industrial machine, the industrial machine machining a workpiece, based on the machining program, the program restart assisting apparatus comprising:
a data acquisition unit configured to acquire time series data of a physical amount relating to the machining of the workpiece detected during continuing the machining;
a machining state change point detection unit configured to detect a change point on which a machining state of the machining is changed, based on data acquired by the data acquisition unit;
a restartable point recording unit configured to record the change point of the machining state, the change point being detected by the machining state change point detection unit, as a restartable point; and
a restart execution point selection unit configured to select a restart execution point from among restartable points recorded by the restartable point recording unit;
wherein the physical amount includes at least one of:
(1) torque data, vibration data or sound data,
(2) a motor temperature,
(3) an amount, a shape or a color of chips,
(4) laser output, or
(5) biological information of an operator; and
the machining state change point detection unit is configured to, based on the data acquired by the data acquisition unit, detect the change point by at least one of
(a) performing a frequency analysis of the torque data, the vibration data, or the sound data which are detected in a predetermined machining period during the machining of the workpiece, and
detecting time, at which a predetermined difference appears in frequency components, as the change point,
(b) detecting time, at which a change rate of the motor temperature detected in a predetermined machining period during the machining of the workpiece is changed by a predetermined threshold value or greater, as the change point,
(c) detecting time, at which the amount, the shape or the color of the chips is changed by a predetermined threshold value or greater based on image data which are detected in a predetermined machining period during the machining of the workpiece, as the change point,
(d) detecting time, at which the laser output detected in a predetermined machining period during laser machining in the machining of the workpiece is changed by a predetermined threshold value or greater, as the change point, or
(e) detecting a change in the biological information of the operator performing the machining with the industrial machine as the change point.

2. The program restart assisting apparatus according to claim 1, wherein the change point of the machining state is a change point in frequency distribution of torque data, vibration data, and sound data of a motor, the torque data, vibration data, and sound data being detected from the industrial machine.

3. The program restart assisting apparatus according to claim 1, wherein the change point of the machining state is a change point in a change rate of temperature data of a motor, the temperature data being detected from the industrial machine.

4. The program restart assisting apparatus according to claim 1, wherein the change point of the machining state is a change point in a torque data of a motor, the torque data being detected from the industrial machine.

5. The program restart assisting apparatus according to claim 1, wherein the change point of the machining state is detected from a chip amount or an image of a chip shape in machining.

6. The program restart assisting apparatus according to claim 1, wherein the change point of the machining state is a change point in laser output in laser machining.

7. The program restart assisting apparatus according to claim 1, further comprising:
a restart execution point command unit configured to
receive the selected restart execution point output from the restart execution point selection unit, and
output a command to the controller for controlling the industrial machine so that the machining is restarted from the restart execution point selected by the restart execution point selection unit.

8. The program restart assisting apparatus according to claim 1, wherein
the change point of the machining state recorded by the restartable point recording unit is highly related to a cause of previous interruption of the machining.

9. The program restart assisting apparatus according to claim 1, wherein
the physical amount includes two or more different physical amounts detected during continuing the machining, and
the machining state change point detection unit is configured to detect the change point based on a combination of the two or more different physical amounts.

10. The program restart assisting apparatus according to claim 1, wherein the machining state change point detection unit is configured to perform a combination of at least two of (a) to (e).

11. The program restart assisting apparatus according to claim 1, further comprising:
a restart execution point analysis unit configured to calculate an evaluation value, the evaluation value being used for detecting the change point by the machining state change point detection unit, based on time series data that is acquired when machining is once interrupted and then restarted.

12. The program restart assisting apparatus according to claim 11, wherein the restart execution point analysis unit includes a machine learning apparatus.

* * * * *